US008555647B2

(12) United States Patent
Dimascio et al.

(10) Patent No.: US 8,555,647 B2
(45) Date of Patent: Oct. 15, 2013

(54) METHODS AND APPARATUS FOR PROVIDING A SACRIFICIAL SHIELD FOR A FUEL INJECTOR

(75) Inventors: Paul Stephen Dimascio, Greer, SC (US); Monty Lee Harned, Houston, TX (US)

(73) Assignee: General Electric Company, Schenectady, NY (US)

( * ) Notice: Subject to any disclaimer, the term of this patent is extended or adjusted under 35 U.S.C. 154(b) by 617 days.

(21) Appl. No.: 12/402,162

(22) Filed: Mar. 11, 2009

(65) Prior Publication Data

US 2010/0229558 A1 Sep. 16, 2010

(51) Int. Cl.
*F23R 3/60* (2006.01)

(52) U.S. Cl.
USPC .............................. 60/740; 60/796; 239/288.3

(58) Field of Classification Search
USPC ................... 60/740, 756, 796, 742, 743, 746; 239/288.3
See application file for complete search history.

(56) References Cited

U.S. PATENT DOCUMENTS

| | | | | |
|---|---|---|---|---|
| 4,454,711 | A * | 6/1984 | Ben-Porat | 60/800 |
| 4,914,918 | A * | 4/1990 | Sullivan | 60/756 |
| 6,581,386 | B2 * | 6/2003 | Young et al. | 60/748 |
| 7,415,828 | B2 * | 8/2008 | Brown | 60/798 |
| 2004/0083735 | A1 * | 5/2004 | Borns et al. | 60/772 |
| 2005/0061004 | A1 | 3/2005 | Colibaba-Evulet et al. | |
| 2006/0027232 | A1 * | 2/2006 | Parker et al. | 126/349 |
| 2007/0193272 | A1 * | 8/2007 | Hebert et al. | 60/740 |
| 2007/0214791 | A1 * | 9/2007 | Schumacher et al. | 60/750 |

FOREIGN PATENT DOCUMENTS

| | | | |
|---|---|---|---|
| CN | 1601181 | A | 3/2005 |
| JP | 2005163685 | A | 6/2005 |

OTHER PUBLICATIONS

CN Patent Office Action 233630_2 dated Jun. 26, 2013.

* cited by examiner

*Primary Examiner* — William H Rodriguez
*Assistant Examiner* — Carlos A Rivera
(74) *Attorney, Agent, or Firm* — Sutherland Asbill & Brennan LLP

(57) ABSTRACT

Embodiments of methods and apparatus for providing a sacrificial shield for a fuel injector are provided. According to one example embodiment, a method for shielding a fuel injector associated with a combustion device is provided. The method can include providing at least one shield support device operable to mount to a tip of a fuel injector. The method can also include mounting a plurality of shields to the at least one support device, wherein each of the plurality of shields is spaced apart from each respective adjacent shield by at least one segmentation, and wherein each of the plurality of shields is operable to reduce heat exposure to the tip of the fuel injector.

16 Claims, 6 Drawing Sheets

100 104 116A 116B 108 114 106 112 110 128 130 126 116 116N 102 118

108 116 110 112 114 122 124 120 118 102

METHODS AND APPARATUS FOR PROVIDING A SACRIFICIAL SHIELD FOR A FUEL INJECTOR

FIELD OF THE INVENTION

The invention relates to combustion equipment, and more specifically relates to methods and apparatus for providing a sacrificial shield for a fuel injector.

BACKGROUND OF THE INVENTION

Generally, fuel is introduced into a combustion chamber for a gas turbine by one or more fuel injectors. Various fuels can include natural gas, coal slurry, and other fossil fuel-based, carbon-based or hydrogen-based fuels. Fuel injectors typically have a limited life span due to their constant exposure to high temperatures. High temperatures are caused by radiant heat from the partial combustion of fuel and oxygen within the combustion chamber. When a fuel injector begins to show heat damage or otherwise fails due to overheating, the associated gas turbine must be shut down to permit repairs or replacement of the damaged fuel injector.

At least one conventional fuel injector uses water circulation to cool particular portions of the fuel injector. In such a fuel injector, cooling can be achieved by circulating water in one or more cavities in the tip of the fuel injector and/or within a jacket surrounding some or all of the body of the fuel injector. However, conventional fuel injectors using water cooling require operating and maintaining associated water circulation systems, which increase the cost to operate the gas turbine.

Accordingly, there is need for methods and apparatus for increasing the life of a fuel injector. There is a further need for providing a sacrificial shield for a fuel injector. There is a further need for providing shielding to a fuel injector associated with a combustion device.

BRIEF DESCRIPTION OF THE INVENTION

Embodiments of the invention can address some or all of the needs described above. According to one embodiment of the invention, there is disclosed a method for providing a sacrificial shield for a fuel injector. The method can include providing at least one shield support device operable to mount to a tip of a fuel injector. The method can also include mounting a plurality of shields to the at least one support device, wherein each of the plurality of shields is spaced apart from each respective adjacent shield by at least one segmentation, and wherein each of the plurality of shields is operable to reduce heat exposure to the tip of the fuel injector.

According to another embodiment of the invention, there is disclosed an apparatus for providing shielding to a fuel injector associated with a combustion device. The apparatus may include at least one shield support device operable to mount to a tip of a fuel injector. The apparatus can also include a plurality of shields to the at least one support device, wherein each of the plurality of shields is spaced apart from each respective adjacent shield by at least one segmentation, and wherein each of the plurality of shields is operable to reduce heat exposure to the tip of the fuel injector.

According to yet another embodiment of the invention, there is disclosed a fuel injector for a combustion system. The fuel injector can include a tip end. The fuel injector can also include at least one shield support device operable to mount to adjacent to the tip end. Furthermore, the fuel injector can include a plurality of shields to the at least one support device, wherein each of the plurality of shields is spaced apart from each respective adjacent shield by at least one segmentation, and wherein each of the plurality of shields is operable to reduce heat exposure to the tip of the fuel injector.

Other embodiments, aspects, and features of the invention will become apparent to those skilled in the art from the following detailed description, the accompanying drawings, and the appended claims.

BRIEF DESCRIPTION OF THE DRAWINGS

Figure 1:
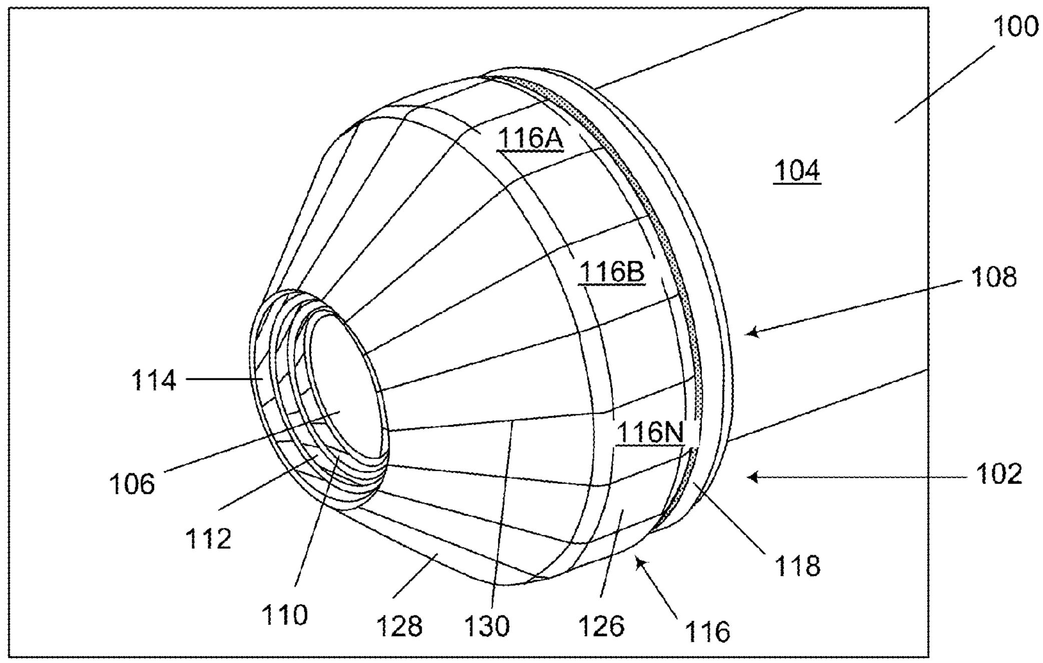

Having thus described the invention in general terms, reference will now be made to the accompanying drawings, which are not necessarily drawn to scale, and wherein:

FIG. 1 illustrates a perspective view of an example fuel injector and apparatus in accordance with an embodiment of the invention.

Figure 2:
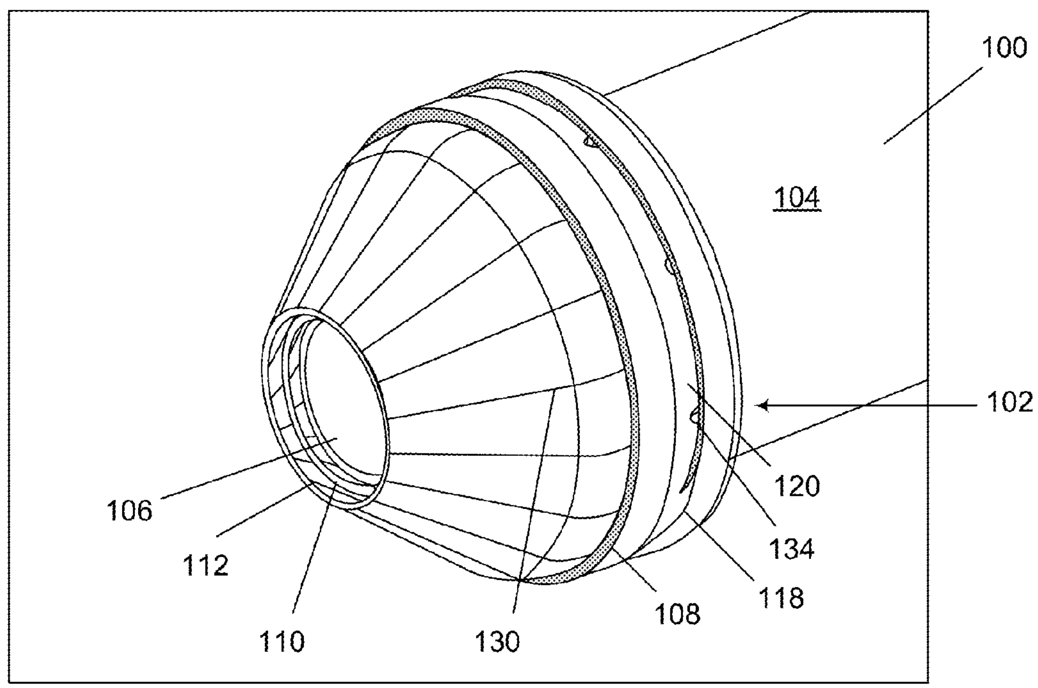

FIG. 2 illustrates a perspective view of the example fuel injector and example apparatus in FIG. 1 with an outer layer of shields removed.

Figure 3:
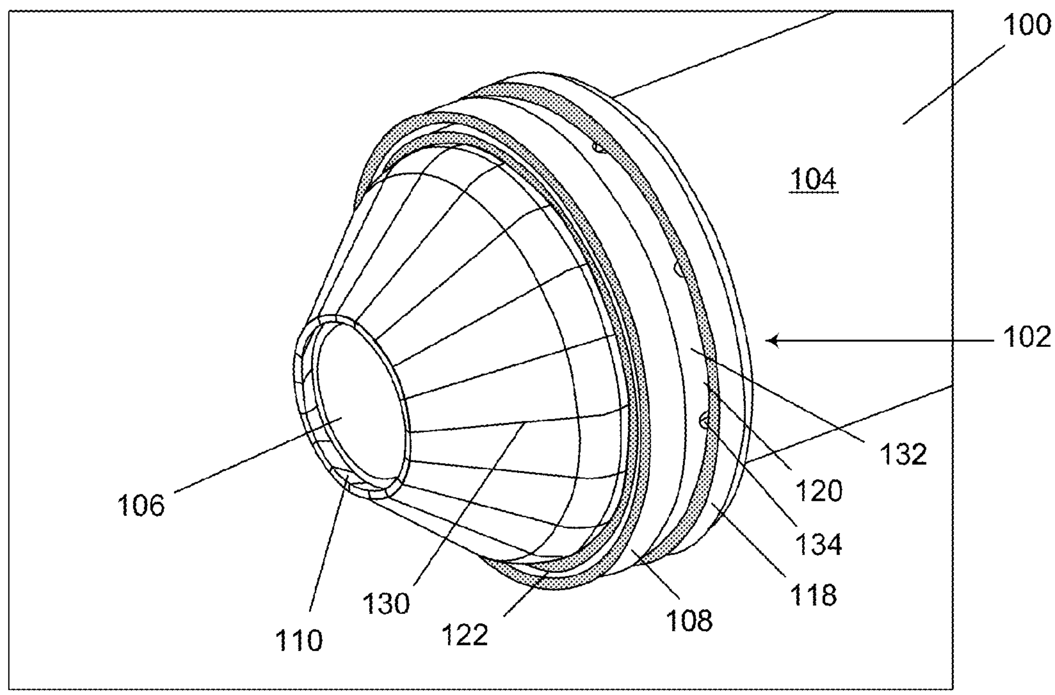

FIG. 3 illustrates a perspective view of the example fuel injector and example apparatus in FIG. 1 with two outer layers of shields removed.

Figure 4:
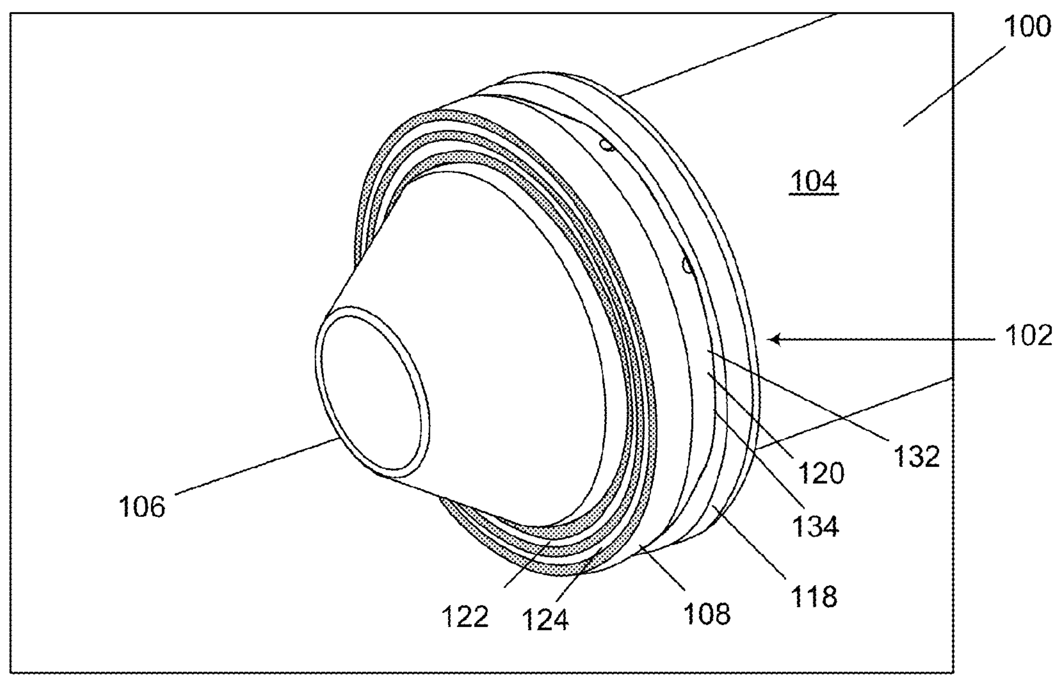

FIG. 4 illustrates a perspective view of the example fuel injector and example apparatus in FIG. 1 with all layers of shields removed.

Figure 5:
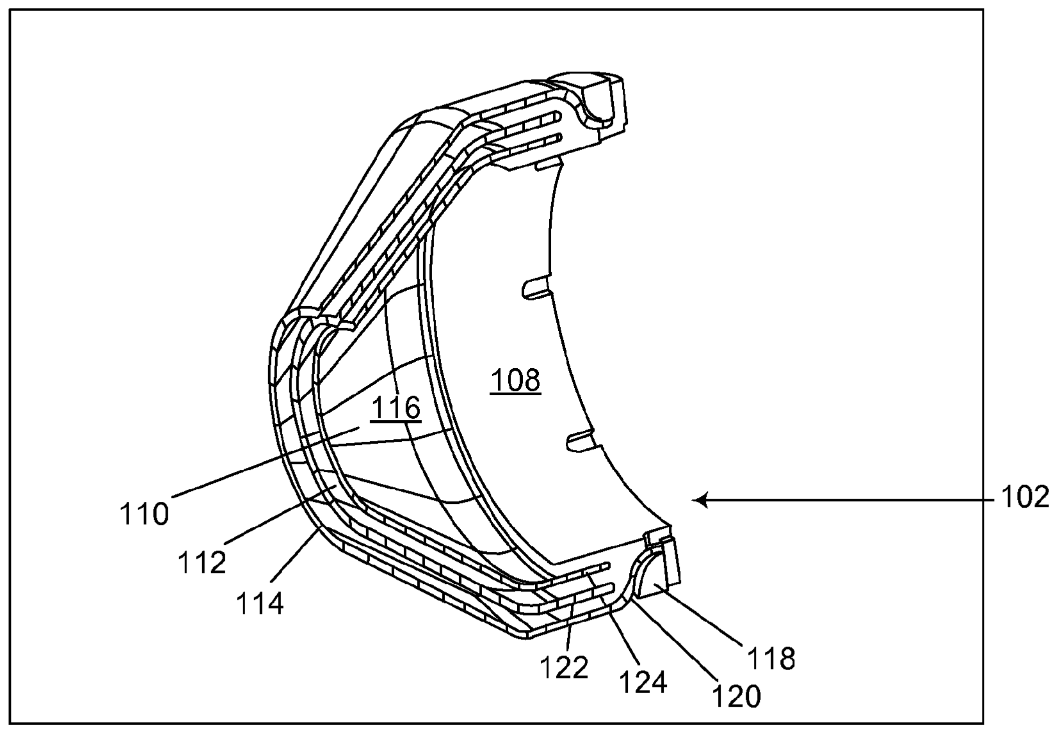

FIG. 5 illustrates a cutaway perspective view of the example apparatus shown in FIG. 1.

Figure 6:
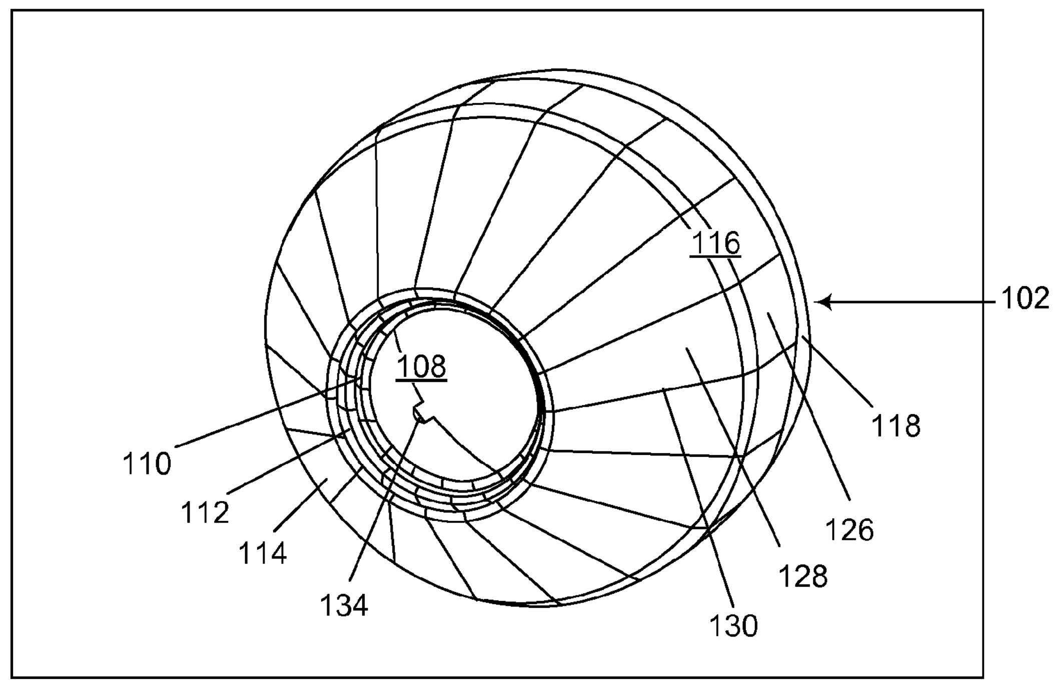

FIG. 6 illustrates a perspective view of the example apparatus shown in FIG. 1.

Figure 7:
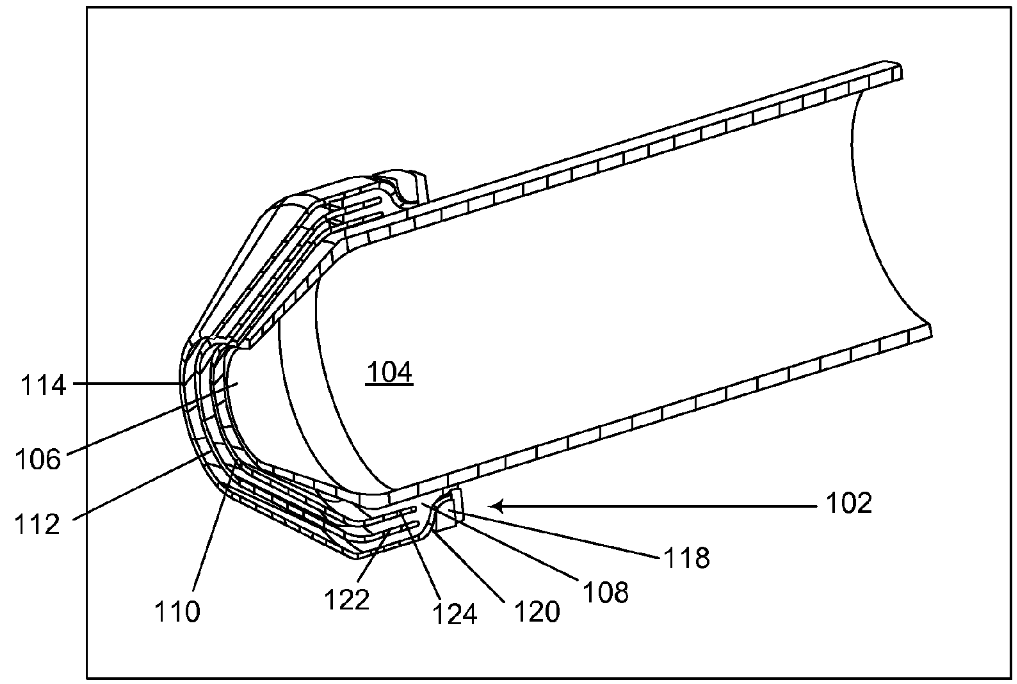

FIG. 7 illustrates a cutaway perspective view of the example fuel injector and example apparatus shown in FIG. 1.

Figure 8:
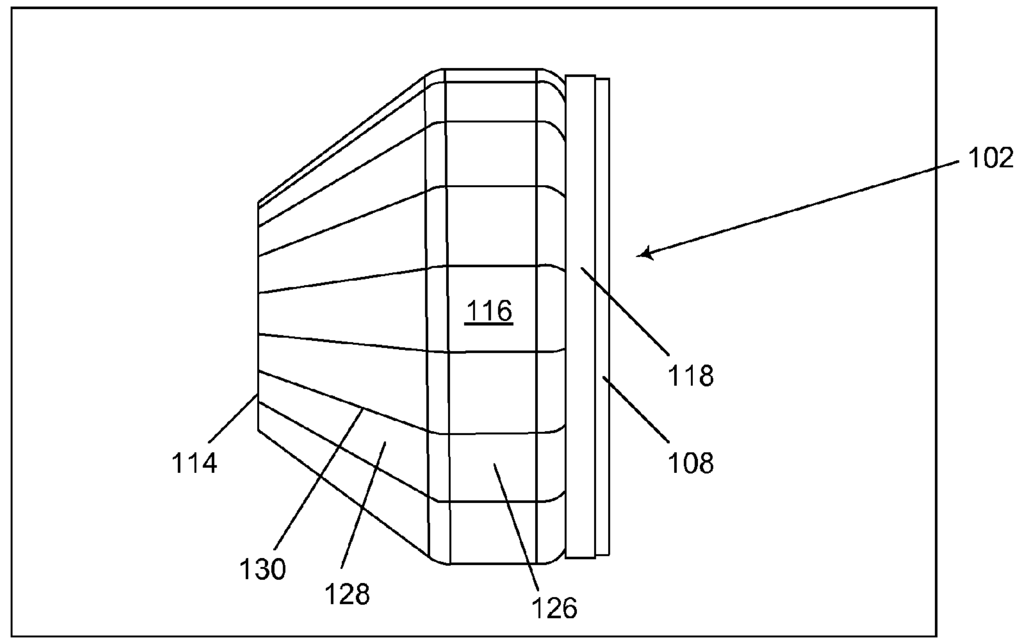

FIG. 8 illustrates a side view of the example apparatus shown in FIG. 1.

Figure 9:
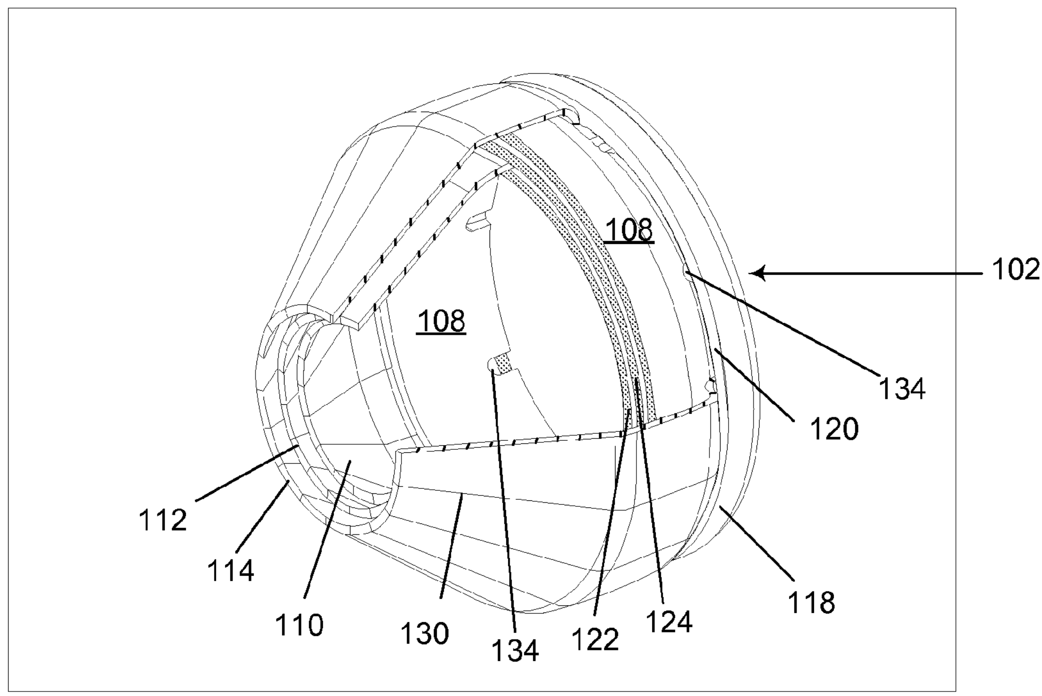

FIG. 9 illustrates a cutaway perspective view of the example apparatus shown in FIG. 1.

Figure 10:
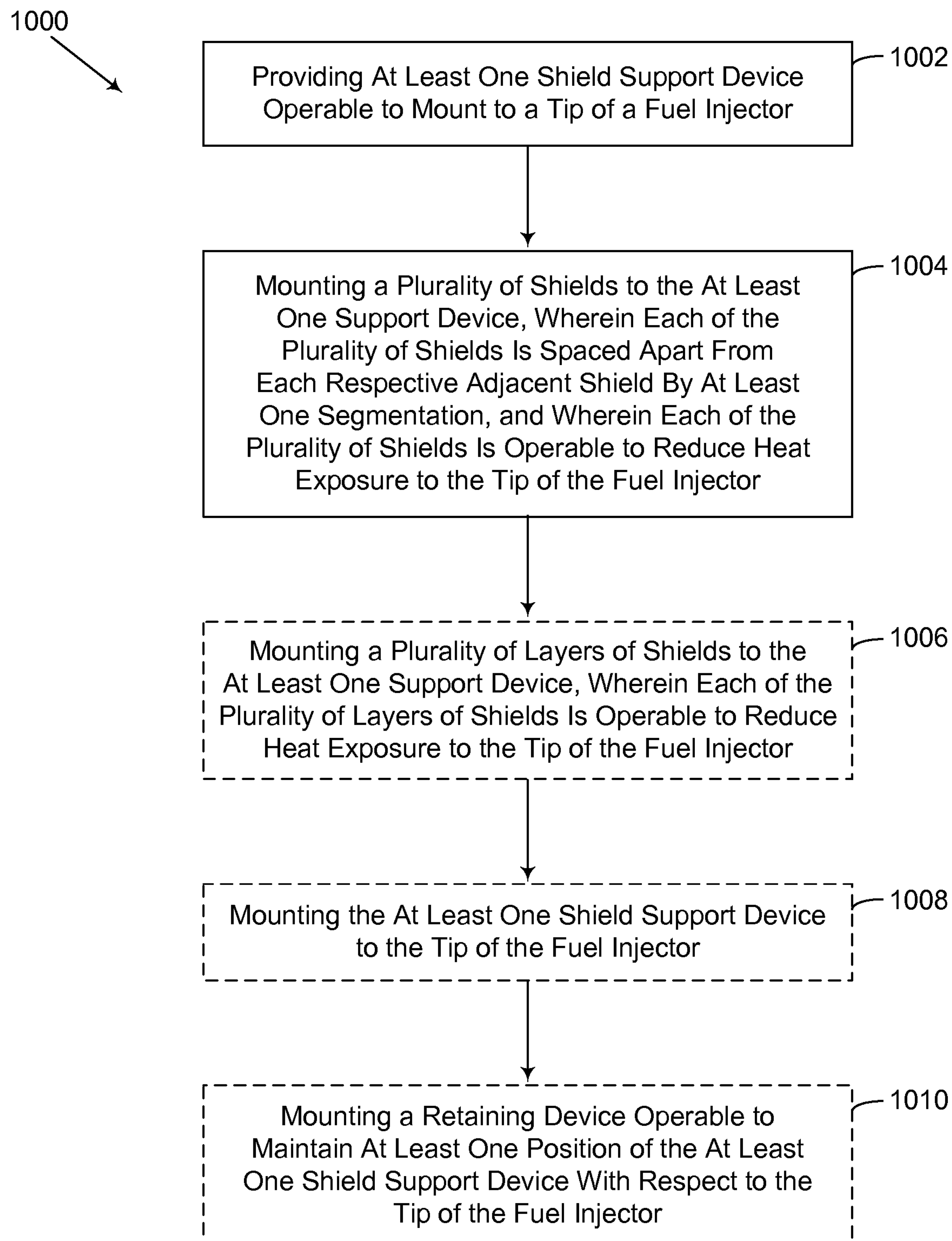

FIG. 10 illustrates an example method in accordance with an embodiment of the invention.

DETAILED DESCRIPTION OF THE INVENTION

Illustrative embodiments of the invention now will be described more fully hereinafter with reference to the accompanying drawings. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are methods and methods and apparatus for providing a sacrificial shield for a fuel injector. FIG. 1 illustrates a perspective view of an example fuel injector 100 and apparatus 102 in accordance with an embodiment of the invention. FIGS. 2-9 illustrate various views of either or both the example fuel injector 100 and apparatus 102 shown in FIG. 1. FIG. 1 shows certain components of an example fuel injector 100, which includes a body 104 and a tip 106 adjacent to one end of the body 104. In the embodiment shown in FIGS. 1-4 and 7, the body 104 can generally be, for example a cylindrical tube-shaped portion connected to, for example, a generally tapering and open-ended portion forming the tip 106. The apparatus 102 shown in FIG. 1 can include at least one shield support device 108, a plurality of layers 110, 112, 114 of shields 116, and at least one retaining device 118. As shown by way of example in FIGS. 1, 5, and 7, a shield support device 108 can be a ring-shaped device with one or more slots 120, 122, 124 operable to receive a corresponding plurality of shields, such as 116. As shown in FIGS. 4 and 7, the shield support device 108 can generally mount adjacent the tip 106 of a fuel injector, such as 100.

Each of the plurality of shields 116, for example, shields 116A, 116B, . . . 116N, can also be known as a "leaf" or collectively as "leaves". Collectively, the leaves or plurality of shields 116 can be arranged generally circumferentially around a portion of a tip of a fuel injector, such as 106. In one embodiment, each of the plurality of shields can be made from materials including, but not limited to, a ceramic, a sintered ceramic, a ceramic composite, a ceramic coated metal, mechanically alloyed oxide dispersion strengthened metals such as PM 2000, stainless steel, superalloys, nickel-chromium-aluminum-iron alloys such as Haynes 214 alloy nickel-chromium-tungsten-molybdenum alloys such as Haynes 230 alloy, an oxidizing material, a reducing material, or any combination thereof. In the example shown, each of the plurality of shields 116 can be shaped to generally conform with the outer surface contour of the body 104 and/or tip 106 of the fuel injector 100. In the embodiment shown in FIGS. 3 and 7, the inner layer 110 of plurality of shields 116 can, for example, have a first portion 126 generally conforming with the outer surface contour of the body 104, and a second portion 128 generally conforming with the outer surface contour of the tip 106 to form an open-tipped cone-shape. When each of the inner layer 110 of plurality of shields 116 is mounted to the innermost slot 120, the outer surface of the tip 106 portion of the fuel injector 100 can generally be shielded from direct exposure to radiant and/or convective heat when the fuel injector 100 and mounted apparatus 102 are inserted into a combustion chamber associated with a gas turbine. Each of the slots 120, 122, 124 shown in FIGS. 5 and 7 are machined or otherwise molded circumferentially around the outer periphery of the shield support device 108. As shown in FIGS. 3, 5, and 7, other layers 112, 114 of shields 116 can overlap the initial or inner layer 110 of plurality of shields 116. For example, an intermediate layer 112 and outer layer 114 of shields 116 can respectively mount to an intermediate slot 122 and/or outer slot 124, which provide concentric positioning of each successive layer 112, 114 of shields 116 to the initial or inner layer 110 of shields 116.

Depending on the type of materials used for the shield support device 108 and the shields 116, a variety of mounting devices and/or techniques can be used including, but not limited to, welding, spot welding, tack welding, stitch welding, brazing, bolting, pressure fitting, swage fitting, anti-rotation pins, and any combination thereof. Furthermore, depending on the position, shape and/or length of the slots 120, 122, 124 in the at least one shield supporting device 108, any number of shields 116 in the respective layers 110, 112, 114 can be designed or otherwise shaped to provide radiant heat protection to either or both the tip 106 of the fuel injector 100 and any underlying layers of shields 116.

As shown in FIGS. 3 and 5, each of the plurality of shields 110 can be spaced apart from each respective adjacent shield of the same layer by at least one segmentation 130. Generally, a segmentation 130 can permit adjacent shields 116 of the same layer, such as 110, 112, 114, to thermally expand and/or vibrate during operation of the fuel injector 100 and/or use of the apparatus 102. In the example shown in FIGS. 3 and 5, the segmentation 130 is relatively narrow and consistent open space or gap between adjacent shields 116. In other embodiments, a segmentation can include, but is not limited to, a fault line, a perforation, a weakened portion, an etched line, or an etched pattern. In any instance, the segmentation 130 can facilitate the "shedding of" or loss of an adjacent shield when the adjacent shield becomes overheated or otherwise damaged, and any remaining shields mounted to the shield support device 108 can maintain protection of adjacent portions of the tip 106.

With each successive layer 112, 114 of shields 116, the length of successive layers 112, 114 of shields 116 may generally become relatively greater in length to provide heat protection to the inner layer 110 of shields 116. In one embodiment, each successive layer of shields 116 may cover a substantial portion of an adjacent inner shield, with a relatively small concentric-shaped portion of each inner shield exposed when axially viewed from the tip of the fuel injector 100. Each shield 116 within each layer 110, 112, 114 may generally have a similar width and shape. However, in certain embodiments each successive layer 112, 114 of shields 116 may have fewer or greater numbers of respective shields than the initial or inner layer 110 of shields 116, and each layer 112, 114 of shields 116 may have a dissimilar width, length, and shape than each shield of the initial or inner layer 110 of shields 116. As shown in FIGS. 1, 6, 8 and 9, the collective layers 110, 112, 114 of shields 116 can protect the tip 106 of a fuel injector 100 from radiant and convective heat, with each successive layer 112, 114 of shields 116 protecting a respective underlying layer 110, 112 of shields 116. Thus, in the embodiment shown, three layers 110, 112, 114 of shields 116 can be utilized to protect a tip 106 of a fuel injector 100. In other embodiments, fewer or greater numbers of layers of shields can utilized.

In the embodiment shown in FIGS. 1, 5, 7, and 8, at least one retaining device 118 can facilitate the mounting the at least one shield supporting device 108 to the tip 106 of the fuel injector 100. In this embodiment, the at least one retaining device is ring-shaped to generally conform with a cavity 132 machined in the exterior surface of the at least one shield supporting device 108. When the at least one shield supporting device 108 is mounted to the exterior surface of the tip 106 of the fuel injector 100, the at least one retaining device 118 can be mounted into the corresponding cavity 132 of the at least one shield supporting device 108 to provide additional gripping force by the at least one shield supporting device on the exterior surface of the tip 106 of the fuel injector 100.

As shown in FIGS. 5 and 9, a series of notches 134 in an edge of at least one shield supporting device 108 can facilitate mounting and/or positioning the shield supporting device 108 with respect to the tip 106. Any number of a corresponding guides can be present on the exterior surface of the body 104 of the fuel injector 100, and when the series of notches 134 of the shield supporting device 108 are aligned with the guides, the notches 134 can facilitate mounting the shield supporting device 108 adjacent to the tip 106. Thus, in the embodiment shown, a combination of corresponding guides and notches 134 can be used to mount the shield supporting device 108 with respect to the tip 106. In other embodiments, a variety of other devices and/or techniques can be used.

In one embodiment, one or more shields 116 can be brazed into corresponding slots in a shield support device such as 108. A portion of the shield support device 108 could then be swaged to maintain the positions of the shields 116 with respect to the shield support device 108. In another embodiment, a shield support device such as 108 could be made from a plurality of segments, which together could form a relatively thick circular-shaped ring. In this configuration, a relatively thin and smaller first ring-shaped segment with a first layer of shields mounted to the first ring-shaped segment could be fillet welded to the body 104 and/or tip 106 of the fuel injector 100. An intermediate and larger second ring-shaped segment with a second layer of shields mounted to the second ring-shaped segment could be fillet welded to the body 104 and/or tip 106 of the fuel injector 100. Then, an outer third ring-shaped segment with a third layer of shields mounted to the third ring-shaped segment could be fillet welded to the body 104 and/or tip 106 of the fuel injector 100.

Other configurations for an apparatus can exist in accordance with other embodiments of the invention depending on the shape and size of the fuel injector associated with a combustion device. The apparatus 102 shown in FIGS. 1-9 is shown by way of example only, and other embodiments of the apparatus can provide sacrificial shielding of a body and/or tip of a fuel injector.

FIG. 10 is a flowchart illustrating an example method 1000 for shielding a fuel injector associated with a combustion device. In the embodiment shown, the example method 1000 can be implemented to shield a fuel injector associated with a combustion device, such as a fuel injector 100 and apparatus 102 shown in FIGS. 1-9.

The example method begins at block 1002. At block 1002, at least one shield support device operable to mount to a tip of a fuel injector is provided, as is described with reference to FIGS. 1-9.

In one aspect of an embodiment of the invention, providing at least one shield support device operable to mount to a tip of a fuel injector can include providing a ring-shaped shield support device comprising a plurality of slots operable to receive a corresponding plurality of shields.

In another aspect of an embodiment of the invention, the plurality of shields can include at least one of: a ceramic, a sintered ceramic, a ceramic composite, a ceramic coated metal, mechanically alloyed oxide dispersion strengthened metals such as PM 2000, stainless steel, superalloys, nickel-chromium-aluminum-iron alloys such as Haynes 214 alloy, nickel-chromium-tungsten-molybdenum alloys such as Haynes 230 alloy, an oxidizing material, a reducing material, or any combination thereof.

Following block 1002 is block 1004, in which a plurality of shields is mounted to the at least one support device, wherein each of the plurality of shields is spaced apart from each respective adjacent shield by at least one segmentation, and wherein each of the plurality of shields is operable to reduce heat exposure to the tip of the fuel injector.

In one aspect of an embodiment of the invention, mounting a plurality of shields to the at least one support device can include inserting the plurality of shields into respective slots provided in the at least one support device.

In another aspect of an embodiment of the invention, the at least one segmentation can include at least one of: a gap between adjacent shields, a fault line, a perforation, a weakened portion, an etched line, or an etched pattern.

In an embodiment of the invention, the method 1000 can include mounting a plurality of layers of the plurality of shields to the at least one shield support device, wherein each of the plurality of layers of the plurality of shields is operable to reduce heat exposure to the tip of the fuel injector.

In an embodiment of the invention, the method 1000 can include mounting the at least one shield support device to the tip of the fuel injector.

In an embodiment of the invention, the method 1000 can include mounting a retaining device operable to maintain at least one position of the at least one shield support device with respect to the tip of the fuel injector.

The method 1000 ends after block 1004

The example elements of FIG. 10 are shown by way of example, and other process embodiments can have fewer or greater numbers of elements, and such elements can be arranged in alternative configurations in accordance with other embodiments of the invention.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices, apparatus, or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method for shielding a fuel injector associated with a combustion device, the method comprising:

providing at least one shield support device operable to mount to a tip of a fuel injector;

mounting a plurality of shields to the at least one shield support device, the plurality of shields comprising a circumferential surface, wherein each of the plurality of shields is spaced apart from each respective adjacent shield by at least one segmentation, wherein each of the plurality of shields is operable to reduce heat exposure to the tip of the fuel injector, wherein the at least one segmentation comprises at least one of: a fault line, a perforation, a weakened portion, an etched line, an etched pattern, or a gap, and wherein the at least one segmentation facilitates shedding one or more adjacent shields when overheating or damage occurs to the one or more adjacent shields; and mounting to the at least one sheild support device at least one successive layer of shields to overlap the plurality of shields, wherein the at least one successive layer of shields comprises a circumferential surface of shields spaced apart from each respective adjacent shield by at least one layer segmentation comprising at least one of: a fault line, a perforation, a weakened portion, an etched line, an etched pattern, or a gap, and wherein the at least one layer segmentation facilitates shedding one or more adjacent shields from the at least one successive layer when overheating or damage occurs to the one or more adjacent shields of the at least one successive layer; and mounting a retaining device operable to maintain at least one position of the at least one shield support device with respect to the tip of the fuel injector, wherein the retaining device conforms with a cavity in an outer surface of the at least one shield support device, and the retaining device substantially extends circumferentially around the external circumferential surface of the fuel injector.

2. The method of claim 1, further comprising:

mounting a plurality of layers of the plurality of shields to the at least one shield support device, wherein each of the plurality of layers of the plurality of shields is operable to reduce heat exposure to the tip of the fuel injector.

3. The method of claim 1, further comprising:

mounting the at least one shield support device to the tip of the fuel injector.

4. The method of claim 1, wherein providing at least one shield support device operable to mount to a tip of a fuel injector comprises providing a ring-shaped shield support device comprising a plurality of slots operable to receive a corresponding plurality of shields.

5. The method of claim 1, wherein mounting a plurality of shields to the at least one shield support device comprises inserting the plurality of shields into respective slots provided in the at least one shield support device.

6. The method of claim 1, wherein the plurality of shields comprises at least one of: a ceramic, a sintered ceramic, a ceramic composite, a ceramic coated metal, a mechanically alloyed oxide dispersion strengthened metal, stainless steel, superalloys, a nickel-chromium-aluminum-iron alloy, a nickel-chromium-tungsten-molybdenum alloy, an oxidizing material, a reducing material, or any combination thereof.

7. An apparatus for providing shielding to a fuel injector associated with a combustion device, the apparatus comprising:

at least one shield support device operable to mount to a tip of a fuel injector; and a plurality of shields mounted to the at least one shield support device, the plurality of shields comprising a circumferential surface, wherein each of the plurality of shields is spaced apart from each respective adjacent shield by at least one segmentation, wherein each of the plurality of shields is operable to reduce heat exposure to the tip of the fuel injector, wherein the at least one segmentation comprises at least one of: a fault line, a perforation, a weakened portion, an etched line, an etched pattern, or a gap, and wherein the at least one segmentation facilitates shedding one or more adjacent shields when overheating or damage occurs to the one or more adjacent shields; and at least one successive layer of shields mounted to the at least one shield support device to overlap the plurality of shields, wherein the at least one successive layer of shields comprises a circumferential surface of shields spaced apart from each respective adjacent shield by at least one layer segmentation comprising at least one of: a fault line, a perforation, a weakened portion, an etched line, an etched pattern, or a gap, and wherein the at least one segmentation facilitates shedding one or more adjacent shields when overheating or damage occurs to the one or more adjacent shields; and wherein an outer surface of the at least one shield support device comprises a cavity to receive a retaining device, and when mounted in the cavity, the retaining device substantially extends around the external circumferential surface of the fuel injector.

8. The apparatus of claim 7, further comprising:

a plurality of layers of the plurality of shields mounted to the at least one shield support device, wherein each of the plurality of layers of the plurality of shields is operable to reduce heat exposure to the tip of the fuel injector.

9. The apparatus of claim 7, wherein the retaining device is operable to maintain at least one position of the at least one shield support device with respect to the tip of the fuel injector.

10. The apparatus of claim 7, wherein the at least one shield support device comprises a ring-shaped shield support device comprising a plurality of slots operable to receive the plurality of shields.

11. The apparatus of claim 7, wherein the plurality of shields comprises at least one of: a ceramic, a sintered ceramic, a ceramic composite, a ceramic coated metal, a mechanically alloyed oxide dispersion strengthened metal, stainless steel, superalloys, a nickel-chromium-aluminum-iron alloy, a nickel-chromium-tungsten-molybdenum alloy, an oxidizing material, a reducing material, or any combination thereof.

12. A fuel injector for a combustion system, the fuel injector comprising:

a tip end;

at least one shield support device operable to mount to adjacent to the tip end; and a plurality of shields mounted to the at least one shield support device, the plurality of shields comprising a circumferential surface, wherein each of the plurality of shields is spaced apart from each respective adjacent shield by at least one segmentation, wherein each of the plurality of shields is operable to reduce heat exposure to the tip of the fuel injector, wherein the at least one segmentation comprises at least one of: a fault line, a perforation, a weakened portion, an etched line, an etched pattern, or a gap, and wherein the at least one segmentation facilitates shedding one or more adjacent shields when overheating or damage occurs to the one or more adjacent shields; and at least one successive layer of shields mounted to the at least one shield support device to overlap the plurality of shields, wherein the at least one successive layer of shields comprises a circumferential surface of shields spaced apart from each respective adjacent shield by at least one layer segmentation comprising at least one of: a fault line, a perforation, a weakened portion, an etched line, an etched pattern, or a gap, wherein the at least one layer segmentation facilitates shedding one or more adjacent shields from the at least one successive layer when overheating or damage occurs to the one or more adjacent shields of the at least one successive layer;

wherein the at least one shield support device comprises a cavity to receive a retaining device, and when mounted in the cavity, the retaining device substantially extends circumferentially around the external circumferential surface of the fuel injector.

13. The fuel injector of claim 12, further comprising:

a plurality of layers of shields mounted to the at least one shield support device, wherein each of the plurality of layers of shields is operable to reduce heat exposure to at least a portion of the plurality of shields.

14. The fuel injector of claim 12, wherein the retaining device is operable to maintain at least one position of the at least one shield support device with respect to the tip of the fuel injector.

15. The fuel injector of claim 12, wherein the at least one shield support device comprises a ring-shaped shield support device comprising a plurality of slots operable to receive the plurality of shields.

16. The fuel injector of claim 12, wherein the plurality of shields comprises at least one of: a ceramic, a sintered ceramic, a ceramic composite, a ceramic coated metal, a mechanically alloyed oxide dispersion strengthened metal, stainless steel, superalloys, a nickel-chromium-aluminum-iron alloy, a nickel-chromium-tungsten-molybdenum alloy, an oxidizing material, a reducing material, or any combination thereof.

* * * * *